United States Patent Office 3,525,780
Patented Aug. 25, 1970

3,525,780
METHOD OF MANUFACTURING POLYMER MATERIALS HAVING LIMITED ELECTROSTATIC CHARGEABILITY
Shu Kambara, Isao Shinohara, and Eishun Tsuchida, Tokyo, Japan, assignors to Chiyoda Kako Kensetsu Kabushiki Kaisha, Tokyo, Japan
No Drawing. Filed Oct. 11, 1966, Ser. No. 585,743
Claims priority, application Japan, Oct. 20, 1965, 40/64,579
Int. Cl. C08f 29/22, 37/18
U.S. Cl. 260—874        3 Claims

ABSTRACT OF THE DISCLOSURE

Polymeric materials of limited electrostatic chargeability are prepared by incorporating into a polymer an oligomer having a similar chemical structure and which is compatible with said polymer, said oligomer having a molecular weight from about $10^2$ to about $10^4$ and having the formula

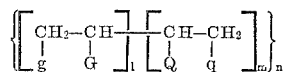

wherein $l$, $m$ and $n$ are numbers greater than 1; G is hydrogen, halogen, phenyl or carboxyl; $g$ is hydrogen, phenyl, or carboxyl; and Q and $q$ are selected from hydrogen, carboxyl, alkali salt of carboxylic acid, acid amide, phenyl, ester of alkyl group having 1–20 carbon atoms, hydroxylated alkyl group having 1–3 carbon atoms, and a phenyl or phenylalkyl group having a quaternary ammonium salt added thereto.

---

This invention relates to a method of manufacturing polymer materials (high molecular weight substances) of limited electrostatic chargeability characterized in that oligomers having certain polar groups are kneaded with, applied on, or laminated with resinous compositions.

Generally polymers are good dielectric substances, and synthetic resins and resinous moldings and films tend to be statically charged easily by only slight friction or contact with other materials in the course of manufacture, or while in storage or in use. This brings various difficulties and problems from the standpoints of industrial production and merchandising. Such disadvantage is one of the inherent and inevitable features of polymers.

Many attempts have been made to inhibit or prevent the static charging of polymers but none of the methods thus far proposed has completely eliminated the disadvantage. The methods heretofore in practice may be roughly classified in two groups:

(1) Application, adsorption, or deposition of surface active agents or the like on the surface of resins (moldings or films).
(2) Kneading of resins with surface active agents or certain other additives.

In principle, these methods are intended to give high molecular weight substances sufficient surface conductivity to preclude build-up of static electricity therein. For example, the above effect as expected by a method whereby an antistatic agent which is a substance having a hydrophilic radical in the molecule is mixed in or deposited on the surface of a polymer material.

The method of group (1) above depend mostly on highly water-soluble active agents for the treatment and the antistatic effect thereby attained is remarkable but short-lived bceause such agents are readily washed away or rubbed off with a corresponding loss of the effect. Moreover, some procedures for the antistatic treatment often give adverse effects such as increased adhesion and hardening of the treated surface.

The methods of group (2) above also have shortcomings in the long run because phase separation and exudation of additives to the surface tend to occur with the lapse of time, sometimes with deterioration of properties such as mechanical strength of the product. Although the use of highly hygroscopic inorganic salts has been proposed as antistatic additives to be kneaded with high molecular substances, the method is not practical because of many difficulties such as chemical attacks to the kneading apparatus and contamination of other materials in the process.

Other proposals include an increase in the moisture contents of compositions by physical means and removal of static charge by irradiation, but none has proved advantageous.

As discussed hereinbefore, the prior art treatments are invariably not deemed perfect because they either give temporarily satisfactory but not durable effects or bring fairly lasting effects but only at the expense of the physical and other properties of the resins themselves.

The present invention provides a method of adding small amounts of oligomers possessing certain polar groups to resinous compositions by kneading, coating, or laminating the latter therewith.

As herein used, the term "oligomers" means low molecular weight polymers as a whole and more specifically, the substances having molecular weights in the range of about $10^2$ to about $10^4$ and which are expressed by the general formula

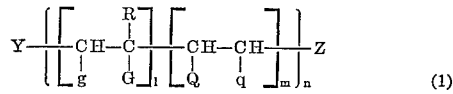    (1)

wherein $l$, $m$ and $n$ are numbers representing average compositions and are not always whole numbers, $l$, $m$ and $n$ being numbers greater than 1 under conditions which satisfy the molecular weight range above specified, Y and Z which may be unobjectionably be the same are hydrogen, halogen or other atom or amino-, methoxy-, nitrile-, phenyl-, alkyl-, olefinic alkyl-, thioether, or ester group of alkyl containing one to four carbon atoms, or other atomic group; R is hydrogen added to $\alpha$ carbon atom for 6, or alkyl group containing one to three carbon atoms; or a group of an organic derivative such as an alcoholic hydroxyl group or carboxyl group, amino group, amide group, quaternary ammonium salt, or their salt, sulfonyl group or its salt, or phosphonyl or phosphinyl group or the like combined directly to $\alpha$ carbon atom, or added to the alkyl group having one to three carbon atoms; G and $g$ which may unobjectionably be the same are hydrogen, halogen, or an organic or inorganic acid ester (specifically, an ester containing 1 to 18 carbon atoms), hydroxy-, phenyl-, nitrile-, aldehyde-, or other group, or a polar group of organic derivative consisting of carboxyl-, hydroxy-, amino-, amide-, imide-, quaternary ammonium-, sulfonyl-, phosphonic or phosphonous group added to the alkyl or ester group, phenyl of ester group, alkyl aryl of ester group, or aryl alkyl of ester group; and Q and $q$ which may unobjectionably be the same are halogen or nitrile-, acetyl-, carboxyl-, or amino-, amide group, or imide group formed of a cycle closed by Q and $q$, or ester group ($C_{1-18}$), or alkyl group ($C_{1-3}$), or a polar group such as hydroxyl-, carboxyl-, ester-, ether-, amino-, imide-, or amide group of the type added to alkyl ($C_{1-3}$) or phenyl group.

The present invention has for its object to attain an antistatic effect on resins which are desired to be protected against static charging, by admixture of the oligomers as above defined through kneading therewith. Not only by kneading, the oligomers of the types described may also be added by formation of coated film or by lamination to give high molecular substances of only limited static chargeability.

Since the oligomers used under the invention are substantially the same in chemical structure as the resins to be kneaded therewith, very good compatibility is attained and the resulting blends are uniform, stable and permanent in composition or have fairly satisfactory stability. Unless the mixing ratios are changed for some special purposes, the addition of such oligomers bring little changes in the mechanical properties, thermal stability, tint, and transparency of the resulting resinous substances.

These blended resinous compositions generally have their static chargeability limited by a mechanism which lowers their specific resistivity on the surface and permits surface leakage of the electric charge. It is therefore desirable that a molding in the atmosphere in the usual humidity condition, for example at a humidity of 50-80%, should have a surface resistivity of not more than $10^{11}\Omega$.

Two or more different types of resinous compositions are blended together through mechanical mixing by various apparatus, in many cases by fusing the materials together at relatively elevated temperatures. Alternatively, it is possible to mix the polymer powders suitably, dissolve the mixture homogeneously in a common solvent, drop the solution into a non-solvent thereby permitting precipitation of the polymers in a thoroughly mixed state, and then separate and refine the precipitate to the final state of a dry powder.

For blended resins uniform distribution of the individual components is essential and problems are usually involved in the compatibility of the components. Oligomers by nature can give compositions as above pointed out, in which they are highly compatible with the resins to be blended therewith. In general, however, introduction of certain polar groups in such high concentrations which are presumably enough to render certain additional properties to the oligomers will bring considerable changes, often depriving the blended resins of their compatibility, even though the blends may have great compatibility because of the similarity in fundametal structure.

The oligomers which are employed according to the method of the invention are not statically charged on rubbing or, if any, to only a negligible degree. They may be mixed in resinous compositions compatible therewith for the effective prevention of static charging of the compositions. In the sense of the term herein used, the "resinous compositions" may include resins of singular compositions such as polystyrenes and polyacrylic esters (e.g. methyl methacrylate) and copolymerized resinous materials such as ABS resins.

Although the ratios at which the oligomers are added depend somewhat upon the structures of the resins, it is advisable to choose optimum ratios (preferably 0.1-20 wt. percent) in the light of the properties expected of the resins, molding conditions, uses, and cost involved.

The present invention will be further described in conjunction with examples thereof which are given for illustrative purposes only and should not be construed to be restrictive.

EXAMPLE 1

Oligostyrene polycarboxylic acid having a polymerization degree of 27.6 and an introduced carboxyl group percentage of 48 (a derivative having a carboxyl group in the position of α carbon atom for phenyl) was added in different amounts of 10% and 5% by weight to polystyrene. These components were mixed-up uniformly and molded with pressure into sheets of 1 to 3 mm. in thickness. A bar magnet was allowed to attract a predetermined amount of iron dust as abrasive material on its tip, and was revolved at a predetermined rate on the sheets so as to accomplish static charging of the samples. The charges were determined with a sector field intensity meter (cf. J. Chem. Soc., Japan (Kogyo Kagaku Zasshi), vol. 69, pp. 1351-55, (1966)). The results obtained were as shown in Table 1.

TABLE 1

| Sample [1] | Surface resis. (Ω) | | Surface potential (V.) | |
|---|---|---|---|---|
| | In air | $10^6$ mm. Hg | In air | $10^{-3}$ mm. Hg |
| 10% additive | $4\times10^9$ | $3\times10^{10}$ | $0\sim\pm2$ | $10\sim20$ |
| 5% additive | $5\times10^9$ | $8\times10^{10}$ | $0\sim\pm2$ | $10\sim20$ |
| After washing with water | | | 0 | $5\sim10$ |

[1] Each sample was washed for five minutes while being rubbed with gauze in water at 40-50° C.

For qualitative determination of the antistatic effect attained, a well-known method was employed, that is, the surface of a sheet-like sample was vigorously rubbed with woolen cloth or fur for about 20 seconds, and tobacco ash was placed at a distance of 1 to 2 mm. from the sheet to see if the sample could attract (+) the ash or not (—). In this example, no such attraction was observed.

EXAMPLE 2

Oligostyrene polymethylol (a derivative having a methylol group in the position of α carbon atom for phenyl in the chain) of the general formula

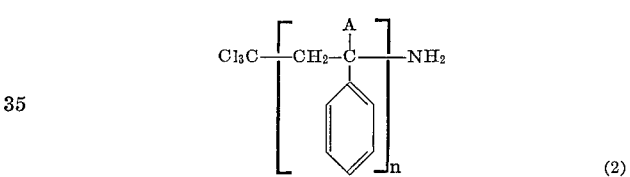

(2)

(wherein $n\cong46$ and A is hydrogen or —CH$_2$OH at a ratio of about 13:33) was added in different amounts of 2 and 5 parts to 100 parts of polystyrene, and both were mixed up uniformly and molded into sheets. The samples thus prepared were treated in the same manner as described in Example 1. The results were as shown in Table 2. The tobacco ash test proved that the samples were not chargeable.

TABLE 2
[Values determined at room temperature]

| Sample | Surface resis. (Ω) | Surface potential (V.) |
|---|---|---|
| 2 part additive | $3\times10^{11}$ | $2\sim12$ |
| 5 part additive | $1\times10^{10}$ | $5\sim10$ |
| 5 times washed | $5\times10^9$ | 0 |

EXAMPLE 3

A co-oligomer having a composition of a methyl methacrylate-acrylic acid ratio of about 60:40 and a mean molecular weight of about 9,500 (corresponding to (I) in Table 3) and another product having a mean molecular weight of about 11,000 and an ester-amide ratio of 50:50 prepared by partially amidizing the ester group of methyl methacrylate in liquid ammonia in the presence of a sodium amide catalyst (corresponding to (II) in Table 3) were added, each in an amount of one part, to 100 parts of polymethyl methacrylate. Each mixture was thoroughly kneaded together and molded into a sheet. The samples obtained in this way were tested for chargeability, and gave results as shown in Table 3. In the tobacco ash test, they did not attract the ash nor lose the transparency characteristic of polymethacrylic resin, and retained unchanged dynamical and other properties.

TABLE 3

| Sample | Surface resis. (Ω) | Frictional surface potential (V.) | Tobacco ash tests |
|---|---|---|---|
| (I) additive | $5 \times 10^{11}$ | $0 \sim \pm 40$ | (−) |
| (II) additive | $8 \times 10^{12}$ | $0 \sim \pm 30$ | (−) |
| (I) 3 times washed | $3 \times 10^{10}$ | $0 \sim \pm 18$ | (−) |
| (II) 3 times washed | $5 \times 10^{10}$ | $0 \sim \pm 0$ | (−) |
| Poly MMA | $1 \times 10^{13}$ | $-380$ | (±) |

EXAMPLE 4

Of derivatives of the co-oligomer of the structural formula given hereinbefore, an oligomer (corresponding to (III) in Table 4, other derivatives described below corresponding likewise to (IV) through (X) in the same table) of the structure in which R, $q$, Y and Z are hydrogen atoms, G is a phenyl group, and $q$ and Q are carboxyl groups; an oligomer in which $q$ and Q are amide groups (corresponding to (IV)); an oligomer in which $q$ and Q are hydroxy groups or hydroxy groups each added to an alkyl group hasing 1 to 3 carbon atoms (V; an oligomer in which $q$ and Q form an imide cycle (VI); and oligomer in which $q$ and Q are imide methylols (VIII); an oligomer in which either $q$ or Q is a carboxyl group and the other is an ester group having 1 to 3 carbon atoms (VIII); an oligomer in which either $q$ or Q is a carboxyl group and the other is an amide group (IX); and an oligomer in which either $q$ or Q is a carboxyl group and the other is an amide methylol group (X), were added in different amounts to 100 parts of polystyrene, and the resultants were tested for chargeability. The results were as shown in Table 4.

TABLE 4
[Values determined in the air at room temperature]

| Sample Structure of co-oligomer | Part per 100 parts of polystyrene | Resis. (Ω) | Fractional surface potential (V.) | Tobacco ash test |
|---|---|---|---|---|
| III | 6 | $5 \times 10^{10}$ | $0 \sim 78$ | (−) |
| IV | 3 | $3 \times 10^{10}$ | 20 | (−) |
| V | 1 | $7 \times 10^{11}$ | $40 \sim 100$ | (−) |
| VI | 5 | $5 \times 10^{10}$ | $10 \sim 100$ | (−) |
| VII | 1 | $5 \times 10^{16}$ | $0 \sim 40$ | (−) |
| VIII | 10 | $3 \times 10^{11}$ | $10 \sim 40$ | (−) |
| IX | 3 | $5 \times 10^{10}$ | $0 \sim \pm 50$ | (−) |
| X | 1 | $5 \times 10^{11}$ | $0 \sim \pm 50$ | (−) |

EXAMPLE 5

Out of the derivatives of co-oligomers of maleic anhydride or fumaric anhydride and vinyl chloride, the oligomer of the structural formula described in which Y, Z, R, and $g$ are hydrogen atoms, G is a chlorine atom, and Q and $q$ are carboxyl groups (corresponding to (XI) in Table 5, as other oligomers designated by subsequent numerals in the same table): an oligomer in which Q and $q$ are hydroxy groups or hydroxy groups added to an alkyl group having 1 to 3 carbon atoms (XII); or an oligomer in which either Q or $q$ is a carboxyl group and the other is an ester group formed of an alkyl group having 1 to 3 carbon atoms (XIII), proved to be very effective antistatic agents for polyvinyl chloride (PVC). In particular those substances which have relatively high hydrophilic group concentrations and contain ester groups whose main chain portions are relatively short (up to molecular weights in terms of thousands) and are of suitable length (e.g. ester groups formed of alkyl radicals having 1 to 20 carbon atoms) have good plasticity and remarkable antistatic effects.

Next, the co-oligomers (XI), (XII), and (XIII) were added, respectively, in different numbers of part per 100 parts of polyvinyl chloride. The antistatic effects thus attained were as shown in Table 5.

TABLE 5

| Sample Structure of co-oligomer | Part per 100 parts of PVC | Resis. (Ω) | Fractional surface potential (V.) | Tobacco ash test |
|---|---|---|---|---|
| XI | 5 | $6 \times 10^{10}$ | $-10 \sim -50$ | (−) |
| XIII | 3 | $5 \times 10^{10}$ | $-10 \sim -60$ | (−) |
| XIII | 10 | $5 \times 10^{9}$ | $-30 \sim -60$ | (−) |

EXAMPLE 6

A derivative of a structure as expressed by the general Formula 1 in which, G, is phenyl and phenyl sulfonic acid, that is, a derivative of p-sulfonic acid of phenyl group of oligostyrene (XIV); a derivative in which Y, Z, $g$ and R are all hydrogen atoms, Q is a carboxyl group and $q$ is butylester of carboxylic acid (XV); and derivatives of the types wherein the acid radicals in (XIV) and (XV) above are sodium salts (XVI) and (XVII) were treated in the same manner as in the Example 1, when they gave results as shown in Table 6.

TABLE 6

| Sample Co-oligomer | Amount added to 100 parts of polystyrene | Rate of introduction of sulfonyl group in phenyl group | Resis. (Ω) | Fric. surface potential (V.) | Tobacco ash test |
|---|---|---|---|---|---|
| XIV | 2 | 0.30 | $6 \times 10^{12}$ | $0 \sim 10$ | (−) |
|  | 5 | 0.48 | $8 \times 10^{10}$ | 0 | (−) |
| XV | 2 | 0.49 | $7 \times 10^{12}$ | $0 \sim 20$ | (−) |
|  | 5 | 0.53 | $7 \times 10^{11}$ | 0 | (−) |
| XVI | 5 | 0.37 | $8 \times 10^{11}$ | $0 \sim 10$ | (−) |
| XVII | 5 | 0.53 | $9 \times 10^{11}$ | $0 \sim 20$ | (−) |

EXAMPLE 7

Of the co-oligomers which are the compounds of the general structural formula described hereinbefore in which R, $g$, Q and Z are hydrogen atoms and $$Y - \left[ \left( \underset{g}{\overset{R}{\underset{|}{CH-C}}} \right)_1 \left( \underset{Q}{\overset{}{\underset{|}{CH-CH}}} \right)_m \right]_n - Z \quad (1)$$

wherein Y is an amino group, G a phenyl group and $q$ is a phenylene group containing substituent which includes nitrogen (that is, co-oligomers consisting of styrene and aromatic nucleus substituted styrene), the co-oligomers in which the substituent of phenylene is $-CH_2N(CH_3)_3 \cdot Cl$ (XVIII) or $-N(C_2H_5)_3 \cdot Cl$ (XIV), and in which $q$ in a quaternary ammonium salt of pyridine nucleus

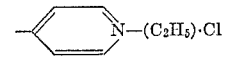

(XX) were mixed in certain percentage into polystyrene and kneaded together at about 180° C. and molded into sheets. The samples thus prepared were allowed to stand for 10 days at a relative humidity (RH) of 65% before the test was run. The results were as shown in Table 7.

TABLE 7

| Sample Co-oligomer | Quat. ammon. group (m./n.) percent | Polym. deg. (n.) | Amt. added to 100 parts of polystyrene (part) | Surface resistivity (Ω) | Frictional surface potential (V.) | Tobacco ash test |
|---|---|---|---|---|---|---|
| XVIII | 26.8 | 39.2 | 2 | $2.6 \times 10^{13}$ | $10 \sim 30$ | (+) |
|  |  |  | 5 | $4.8 \times 10^{11}$ | $10 \sim 20$ | (−) |
| XIX | 41.1 | 47.6 | 2 | $7.6 \times 10^{11}$ | $10 \sim 30$ | (−) |
|  |  |  | 5 | $3.1 \times 10^{11}$ | $0 \sim 20$ | (−) |
| XX | 32.7 | 49.0 | 2 | $3.8 \times 10^{12}$ | $10 \sim 35$ | (−) |
|  |  |  | 5 | $2.7 \times 10^{11}$ | $10 \sim 30$ | (−) |

EXAMPLE 8

Co-oligomers of the structural formula described hereinbefore in which phosphonic group $-PC_3H_2$ (XXI), phosphonous group $-PO_2H_2$ (XXII), or phosphonamide group (XXIII) was introduced into the aromatic nucleus of oligostyrenes prepared by solution polymerization which had a mean polymerization degree $n$ of 67 and in which Y and Z had no definite structure but were presumed to be formed of hydrogen atoms or other atomic groups, were mixed in commercially available ABS (acrylonitrile-butadiene-styrene) resin and molded together into sheets, in the same way as described in Example 1. The results of a test conducted with the samples at RH 60% were as shown in Table 8. The samples of co-oligomers (XXI), (XXII) and (XXIII) had polymerization degrees $n$ of 47.6, 28.3 and 28.3 and polar group introduction rates $m/n$ of 31.60%, 44.9% and 44.9%, respectively.

TABLE 8

| Co-oligomer | | | | |
|---|---|---|---|---|
| Type | Amount added to 100 parts of ABS resin (part) | Surface resis. (Ω) | Frictional surface potential (V.) | Tobacco ash test |
| XXI | 3 | 5.7×10¹¹ | 10~40 | (−) |
|  | 6 | 2.4×10¹⁰ | 10~25 | (−) |
| XXII | 3 | 3.2×10¹⁰ | 10~25 | (−) |
| XXIII | 5 | 6.6×10⁹ | 0~30 | (−) |

EXAMPLE 9

Co-oligomers composed of styrene and 2-NNN triethyl-N-chloro-quaternary ammonium ethyl methacrylate of the formula $$\begin{array}{c} CH_3 \\ | \\ CH_2=C \\ | \\ C=O\;Cl \quad CH_2CH_3 \\ | \quad\quad\quad / \\ O\,CH_2CH_2N-CH_2CH_3 \\ \quad\quad\quad \backslash \\ \quad\quad\quad CH_2CH_3 \end{array}$$

were tested in the same manner as in Example 1, at RH 65%, and gave results as shown in Table 9.

having a polymerization degree $n$ of 42, and in the general formula thereof Y, $g$, R, Q, and Z are hydrogen atoms, G is phenyl group, and $q$ is phenyl sulfonic acid (XXIV), or in which $q$ is phenyl sulfonic stannate (XXV), phenyl sulfonic amide (XXVI), or methyl phenyl sulfonate (XXVII) were added to GP (general purpose) polystyrene, and the samples were tested at RH 70%. The results were as shown in Table 10.

TABLE 10

| Co-oligomer | | | | | |
|---|---|---|---|---|---|
| Type | Styrene content, percent | Amount added to 100 parts of polystyrene, percent | Surface resis. (Ω) | Frictional surface potential (V.) | Tobacco ash test |
| XXIV | 61.2 | 5 | 8.5×10⁸ | 0~20 | (−) |
| XXV |  | 5 | 3.7×10¹⁰ | 10~30 | (−) |
| XXVI |  | 5 | 7.4×10⁹ | 10~40 | (−) |
| XXVII |  | 5 | 5.2×10¹⁰ | 10~30 | (−) |

What is claimed is:

1. A method of preparing polymer materials of limited electrostatic chargeability comprising incorporating a polymer with an oligomer having a similar chemical structure, said oligomer being compatible with said polymer, having at least one polar group, and having the general formula

wherein $l$, $m$, and $n$ are numbers having a value greater than 1 and which oligomer has an average molecular weight of from about $10^2$ to about $10^4$; G is selected from hydrogen, halogen, phenyl, and carboxyl; $g$ is selected from hydrogen, phenyl, and carboxyl; and Q and $q$, which may unobjectionably be the same, are selected from hydrogen, carboxyl, alkali salt of carboxylic acid, acid amide, phenyl, ester of alkyl group having 1–20 carbon atoms, hydroxylated alkyl group having 1–3 carbon atoms, and a phenyl or phenylalkyl group having a quaternary ammonium salt added thereto.

2. The method of claim 1 comprising incorporating from about 0.1 to 20% by weight of said oligomer with said polymer, based on the weight of said polymer.

TABLE 9

| Co-oligomer | | Resin treated | Amount added to 100 parts of resin (part) | Surface resis. (Ω) | Frictional surface potent. (V.) | Tobacco ash test |
|---|---|---|---|---|---|---|
| Styrene content, (percent) | Mean Mol. wt. (M.) |  |  |  |  |  |
| 66 | 4,000 | GP polystyrene ¹ | 2 | 6.4×10¹⁰ | 10~30 | (−) |
|  |  | Polymethyl methacrylate | 2 | 8.6×10¹¹ | 20~40 | (+) |
|  |  | ABS | 3 | 7.1×10¹⁰ | 10~30 | (−) |
|  |  | AS | 3 | 5.7×10¹⁰ | 6~25 | (−) |
| 72 | 5,050 | GP polystyrene ¹ | 2 | 8.2×10¹² | 40~100 | (+) |
|  |  | Polymethyl methacrylate | 2 | 7.4×10¹¹ | 20~60 | (+) |
|  |  | ABS | 4 | 6.9×10¹⁰ | 20~40 | (−) |
|  |  | AS | 4 | 3.2×10¹¹ | 20~50 | (−) |
| 31 | 2,960 | Polymethyl methacrylate | 3 | 3.3×10⁹ | 0~20 | (−) |
|  |  | ABS | 3 | 4.5×10¹⁰ | 0~20 | (−) |

¹ GP = General purpose.

EXAMPLE 10

Co-oligometers which are similar to the compounds described in Example 6 but are oligostyrene derivatives 3. The method of claim 1 wherein the polymer is selected from polystyrene, and polyvinylchloride.

(References on following page)

References Cited

UNITED STATES PATENTS

| | | | |
|---|---|---|---|
| 2,279,410 | 4/1942 | Nadeau et al. | 95—9 |
| 2,628,221 | 2/1953 | Marsh | 260—85.7 |
| 2,707,709 | 5/1955 | Buchdahl et al. | 260—45.5 |
| 2,723,246 | 11/1965 | Boyd et al. | 260—29.6 |
| 2,980,634 | 4/1961 | Melamed | 260—2.1 |
| 3,146,882 | 9/1964 | Wallmer et al. | 206—59 |
| 3,219,639 | 11/1965 | Fuchs | 260—80.5 |
| 3,402,223 | 9/1968 | Hollingsworth | 260—897 |

SAMUEL H. BLECH, Primary Examiner

R. J. SEIBERT, Assistant Examiner

U.S. Cl. X.R.

260—887, 893, 898, 899, 901

UNITED STATES PATENT OFFICE
CERTIFICATE OF CORRECTION

Patent No. 3,525,780          Dated August 25, 1970

Inventor(s) Shu Kambara et al

It is certified that error appears in the above-identified patent and that said Letters Patent are hereby corrected as shown below:

In the Abstract of the Disclosure and in Claim 1, the formula should appear as follows:

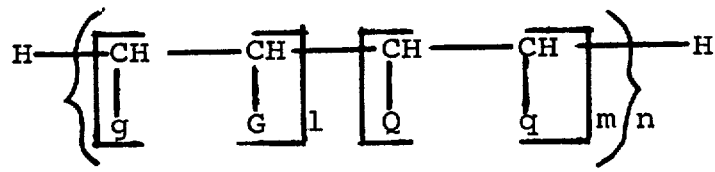

SIGNED AND SEALED
FEB 9 1971

(SEAL)
Attest:

Edward M. Fletcher, Jr.
Attesting Officer

WILLIAM E. SCHUYLER, JR.
Commissioner of Patents